US012198005B1

(12) United States Patent
Madsen et al.

(10) Patent No.: US 12,198,005 B1
(45) Date of Patent: Jan. 14, 2025

(54) QUANTUM COMPUTING USING MULTIPLE QUANTUM COMPUTERS

(71) Applicant: Amazon Technologies, Inc., Seattle, WA (US)

(72) Inventors: Christian Bruun Madsen, Longmont, CO (US); Jeffrey Paul Heckey, Seattle, WA (US); Cody Aoan Wang, Seattle, WA (US); Yunong Shi, Stamford, CT (US)

(73) Assignee: Amazon Technologies, Inc., Seattle, WA (US)

( * ) Notice: Subject to any disclaimer, the term of this patent is extended or adjusted under 35 U.S.C. 154(b) by 701 days.

(21) Appl. No.: 17/470,947

(22) Filed: Sep. 9, 2021

(51) Int. Cl.
*G06F 11/00* (2006.01)
*G06F 11/07* (2006.01)
*G06N 10/00* (2022.01)

(52) U.S. Cl.
CPC ......... *G06N 10/00* (2019.01); *G06F 11/0703* (2013.01)

(58) Field of Classification Search
USPC ........ 717/106, 107, 108, 109, 110, 111, 112, 717/140, 161
See application file for complete search history.

(56) References Cited

U.S. PATENT DOCUMENTS

| | | |
|---|---|---|
| 6,741,585 B1 | 5/2004 | Munoz et al. |
| 7,484,091 B2 | 1/2009 | Bade et al. |
| 7,996,836 B1 | 8/2011 | McCorkendale et al. |
| 8,032,899 B2 | 10/2011 | Archer et al. |
| 8,127,292 B1 | 2/2012 | Dobrovolskiy et al. |
| 8,201,161 B2 | 6/2012 | Challener et al. |
| 8,239,557 B2 | 8/2012 | McCune et al. |
| 8,433,802 B2 | 4/2013 | Head et al. |
| 8,514,868 B2 | 8/2013 | Hill |
| 9,323,552 B1 | 4/2016 | Adogla et al. |
| 9,361,145 B1 | 6/2016 | Wilson et al. |
| 9,485,323 B1 | 11/2016 | Stickle et al. |

(Continued)

FOREIGN PATENT DOCUMENTS

| | | |
|---|---|---|
| EP | 1701259 | 9/2006 |
| EP | 2557498 | 2/2013 |

OTHER PUBLICATIONS

Jeff Barr, "Amazon Braket—Get Started with Quantum Computing", AWS News Blog, Retrieved from https://aws.amazon.com/blogs/aws/amazon-braket-get-started-with-quantum-computing/ on Sep. 1, 2021, pp. 1-7.

(Continued)

*Primary Examiner* — Brian Ngo
(74) *Attorney, Agent, or Firm* — Alexander A. Knapp; Kowert, Hood, Munyon, Rankin & Goetzel, P.C.

(57) ABSTRACT

A quantum computing service may use multiple quantum computers to execute a same quantum computing algorithm to improve the quantum computational accuracy. The quantum computing service may instruct individual ones of the multiple quantum computers to execute the quantum computing algorithm repeatedly for a number of times. The quantum computing service may obtain a plurality of results from the multiple quantum computers. The quantum computing service may aggregate the plurality of results to generate an ensemble result, and provide the ensemble result to a customer as a final result of the quantum computing algorithm.

20 Claims, 10 Drawing Sheets

(56) References Cited

U.S. PATENT DOCUMENTS

| | | | |
|---|---|---|---|
| 9,979,694 | B2 | 5/2018 | Brandwine et al. |
| 10,095,537 | B1 | 10/2018 | Neogy et al. |
| 10,482,413 | B2 | 11/2019 | Paterra |
| 10,498,611 | B1 | 12/2019 | Kloberdans et al. |
| 10,592,216 | B1 * | 3/2020 | Richardson ......... G06F 11/3452 |
| 11,270,220 | B1 * | 3/2022 | Richardson ........... G06F 9/5066 |
| 2005/0013280 | A1 | 1/2005 | Buddhikot et al. |
| 2005/0251806 | A1 | 11/2005 | Auslander et al. |
| 2008/0244553 | A1 | 10/2008 | Cromer et al. |
| 2010/0070970 | A1 | 3/2010 | Hu et al. |
| 2011/0075667 | A1 | 3/2011 | Li et al. |
| 2011/0131443 | A1 | 6/2011 | Laor et al. |
| 2014/0208413 | A1 | 7/2014 | Grobman et al. |
| 2015/0160884 | A1 | 6/2015 | Scales et al. |
| 2016/0026573 | A1 | 1/2016 | Jacobs et al. |
| 2016/0077845 | A1 | 3/2016 | Earl et al. |
| 2016/0170781 | A1 | 6/2016 | Liguori et al. |
| 2016/0170785 | A1 | 6/2016 | Liguori et al. |
| 2017/0300354 | A1 | 10/2017 | Dalal et al. |
| 2017/0366606 | A1 | 12/2017 | Ben-Shaul et al. |
| 2018/0260125 | A1 | 9/2018 | Botes et al. |
| 2020/0326977 | A1 * | 10/2020 | Gambetta ............. G06F 9/5044 |

OTHER PUBLICATIONS

Peter Karaleka, et al., "Fast hybrid programming with Quantum Cloud Services", Retrieved from https://medium.com/rigetti/fast-hybrid-programming-with-quantum-cloud-services-7573f48b93b5 on Jul. 30, 2021, pp. 1-8.

U.S. Appl. No. 16/698,674, filed Nov. 27, 2019, Jeffrey Paul Heckey, et al.

Igor L. Markov, et al., "Quantum Supremacy is Both Closer and Farther than It Appears", arXiv:1807.10749v3, Sep. 26, 2048. pp. 1-32.

Ozgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-02/13/04, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253-01/10/09, pp. 1-11.

Robbert van Renesse, et al, "Chain Replication for Supporting High Throughput and Availability," USENIX Association, OSDI 2004: 6th Symposium on Operating Systems Design and Implementation, pp. 91-104.

Philip A. Bernstein, et al, "Concurrency Control and Recovery in Database Systems, " Addison-Wesley Publication Company, ISBN 0-201-10715-5, 1987, pp. 1-58.

From Wikipedia, the free encyclopedia, "Bromium," downloaded on Jun. 27, 2016 from https://en.wikipedia.org/wiki/Bromium, pp. 1-4.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/Hypervisor, pp. 1-7.

Axel Buecker, et al., "Reduce Risk and Improve Security on IBM Mainframes: vol. 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

From Wikipedia, the free encyclopedia, "Xen," downloaded from Jun. 6, 2016 from https://en.wikipedia.org/wiki/Xen, pp. 1-12.

Udo Steinberg, et al., "Nova: A Microhypervisor-Based Secure Virtualization Architecture", ACM, EuroSys'10, Apr. 13-16, 2010, pp. 209-222.

Sangster, et al., TCG Published, Virtualized Trusted Platform Architecture Specification, Specification Version 1.0, Revision 0.26, Sep. 27, 2011, pp. 1-60.

Network Functions Virtualisation (NFV); NFV Security; Security and Trust Guidance, ETSI GS NFV-SEC 003, V1.1.2, downloaded by EP on Jun. 4, 2016, pp. 1-57.

Cong Xu, et al., "vSlicer: Latency-Aware Virtual Machine Scheduling via Differentiated-Frequency CPU Slicing", Purdue University, Purdue e-Pubs, 2012, pp. 1-14.

Amazon Web Services, "Amazon Elastic Compute Cloud: User Guide for Linux Instances," Latest Version update 2018, pp. 1-884.

Amazon Web Services, "Amazon Elastic Container Service: Developer Guide" API Version, Nov. 13, 2014, pp. 1-386.

Amazon Web Services, "AWS Lambda: Developer Guide" 2018, pp. 1-539.

AWS, "Announcing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.

Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.

U.S. Appl. No. 16/698,698, filed Nov. 27, 2019, Derek Bolt, et al.

U.S. Appl. No. 16/698,732, filed Nov. 27, 2019, Jeffrey Paul Heckey, et al.

U.S. Appl. No. 16/698,737, filed Nov. 27, 2019, Christopher Kasprowicz, et al.

"1.11 Ensemble methods", Retrieved from https://scikit-learn.org/stable/modules/ensemble.html, Sep. 1, 2021, pp. 1-18.

U.S. Appl. No. 17/393,286, filed Aug. 3, 2021, Saravanakumar Shanmugam Sakthivadivel, et al.

* cited by examiner

QUANTUM COMPUTING USING MULTIPLE QUANTUM COMPUTERS

BACKGROUND

A service provider network may allow clients to access services, via network connections, that are implemented using resources at locations remote from the clients. Such services may be said to reside "in the cloud." Cloud-based quantum computing service may provide clients access to quantum computers (also called quantum processing units (QPUs)) of various quantum hardware providers (QHPs). Quantum computers utilize the laws of quantum physics to process information. Compared to classical (binary) computers, quantum computers work with quantum bits (or qubits). Qubits can experience the phenomena of "superposition" and "entanglement." Superposition allows a qubit to be in multiple states at the same time. For example, whereas a classical computer is based on bits that are either zero or one, a qubit may be both zero and one at the same time, with different probabilities assigned to zero and one. Entanglement is a strong correlation between qubits, such that the qubits are inextricably linked in unison even if separated by great distances. By using superposition and entanglement, quantum computers have the potential to process information in new ways to solve computational problems that are beyond the reach of classical computers.

Figure 1:
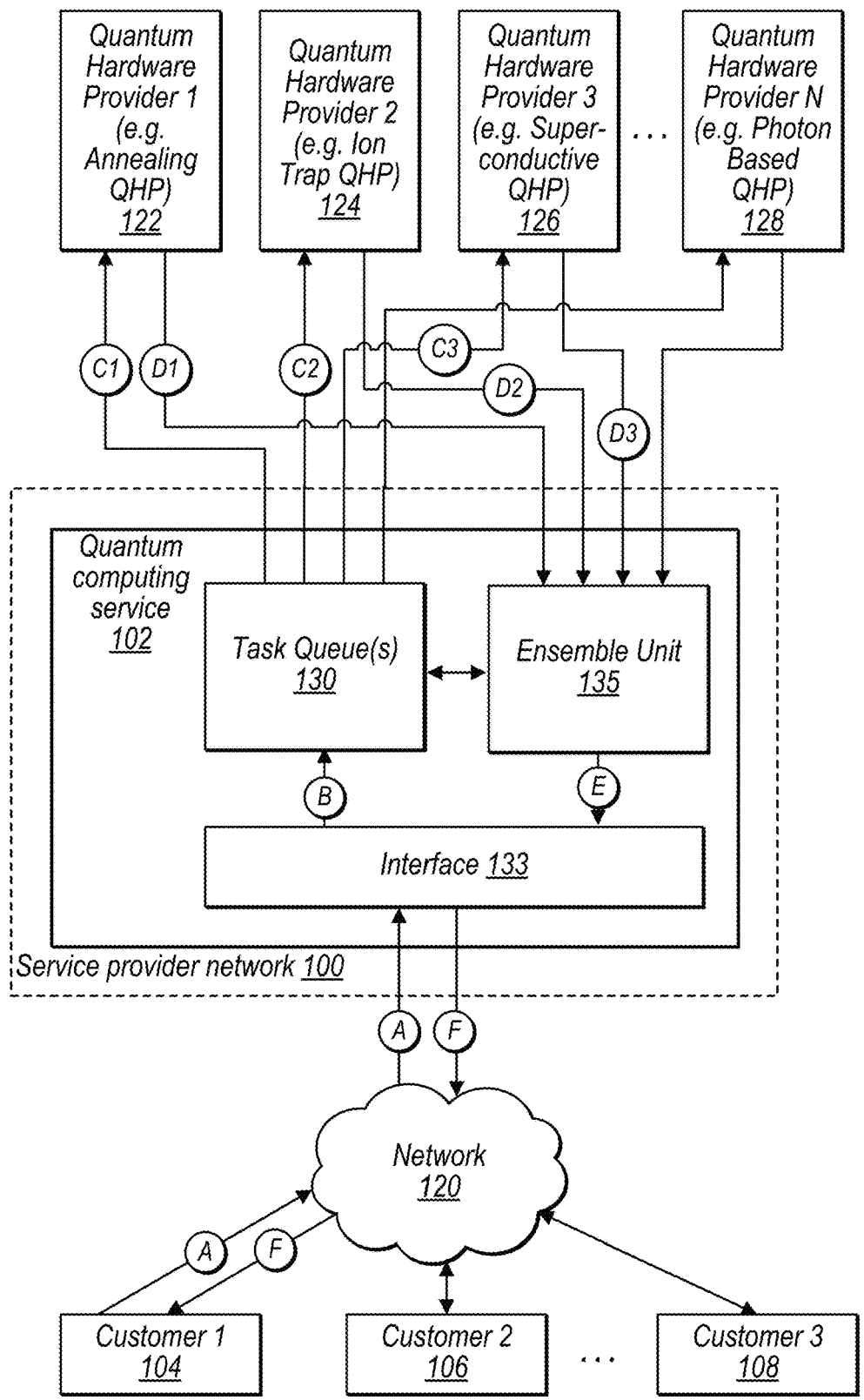
FIG. 1 shows an example quantum computing service that may use multiple quantum computers to correct errors and improve accuracy for execution of a quantum computing algorithm, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Qubits are sensitive to interactions with their environment, and any noise affecting the qubits activities may cause errors in a quantum computation. Some error correction techniques employ redundancy. One way to perform error correction is to store quantum information multiple times using multiple qubits, and—if these copies are later found to disagree—perform a majority vote from the qubits to determine a logical result. Thus, the performance of these methods for a given quantum computer is generally dependent on a number of qubits within a given quantum computer redundantly storing the quantum information. But such methods can be challenging in practice, given the limited number of available qubits in quantum computers.

In some embodiments, quantum computers provided by quantum hardware providers may be implemented using different quantum computing technologies. For example, some quantum computers may include qubits built from superconductors, trapped ions, semiconductors, photonics, etc. Thus, for a given quantum computing algorithm, these quantum computers may generate noise and errors independently and/or in different ways. A cloud-based quantum computing service of a service provider network may provide customers access to different quantum computers offered by the quantum hardware providers. Thus, it may be possible to reduce computational errors and improve computational accuracy by leveraging this capability to use multiple quantum computers to execute a same quantum computing algorithm around the same time, e.g. in parallel. The results from the multiple quantum computers may then be aggregated to generate an ensemble result, as the final result, of the quantum computing algorithm for the customer. Further, even though a given quantum computer may have only a limited number of qubits, the use of multiple quantum computers may essentially increase the number of qubits involved in computing the final result for the quantum computing algorithm, and thus improve the quantum computing accuracy.

Various embodiments described herein relate to techniques for using multiple quantum computers, via a network-accessible cloud-based quantum computing service of a service provider network, to reduce errors and improve quantum computing accuracy. In some embodiments, the quantum computing service may receive a quantum computing algorithm from a customer, e.g., through an interface of the quantum computing service. The interface may be a graphic interface on a website, an interface for command line input (CLI), an application programming interface (API), a software development kit (SDK), etc. In some embodiments, the quantum computing algorithm may be in a generic representation, e.g., in a form portable across different client-side computing systems. For example, the quantum computing algorithm may be in a generic graphic representation, e.g., developed by a customer using a software development kit of the quantum computing service. Alternatively, the quantum computing algorithm may include one or more pieces of codes written in a generic quantum programming language, such as cQASM, PyQuil, etc.

In some embodiments, in response to receiving the quantum computing algorithm, the quantum computing service may select multiple quantum computers out of a pool of quantum computers from various quantum hardware providers. The quantum hardware providers may or may not be a same company or organization as the service provider. In some embodiments, when the quantum computing algorithm is in a generic representation, the quantum computing service may automatically translate it into different forms or representations (e.g., native gate-level files) native and specific to the quantum hardware of the different selected quantum computers. In some embodiments, the quantum computing service may send the native files respectively to the quantum computers, which may be further compiled into executable files (e.g., binary files) at the quantum hardware providers that may be understood and executed directly on the quantum computers. Alternatively, the quantum computing service may generate the compiled files, and then send the compiled files to the quantum computers for execution.

In some embodiments, the quantum computing service may request individual ones of the selected quantum computers to execute the quantum computing algorithm repeatedly for a number of times. In return, the quantum computing service may obtain a set of results from the individual ones of the quantum computers, one result corresponding to one iteration of execution at a corresponding quantum computer. In some embodiments, the quantum computing service may determine weights for the quantum computers. In some embodiments, the weights may be determined based, at least in part, on calibration data of the quantum computers. For example, in some embodiments, the calibration data of a quantum computer may include data representative of a computational quality of a quantum computer. For example, in some embodiments, the calibration data of a quantum computer may include various calibration metrics, such as isolated readout error, parallel readout error, readout separation error, average error, incoherent error, Pauli error, etc. Thus, a lower error reading may indicate a better computational quality of a quantum computer. In addition, generally computational errors may be caused by unwanted quantum drift in a quantum computer. Thus, in some embodiments, the calibration quality of a quantum computer may also be associated with a time at which the quantum computer was last calibrated (or updated). For example, when a quantum computer is calibrated more recently, the quantum drift may be corrected more recently, and thus the quantum computer may be able to provide a more accurate computational result. Therefore, in some embodiments, the quantum computing service may assign a weight of a higher value to one quantum computer that was updated recently (e.g., presuming that its computational accuracy may be better since it was just calibrated), and a weight of a lower value to another quantum computer updated a longer time ago (e.g., presuming that it may be less accurate since it was calibrated much earlier), assuming that the calibration time reflects the calibration quality of the quantum computers. But note that in some embodiments, especially for quantum computers implemented using different technologies, quantum drift may have different temporal characteristics between the different quantum computers. For example, the quantum drift in one quantum computer may occur on a much shorter time frame than that of another quantum computer based on a different quantum technology. Thus, in some embodiments, the calibration time alone may not be a sufficient indicator of the calibration quality. In that case, the quantum computing service may determine the weights for the quantum computers based, at least in part, on other calibration metrics (e.g., readout error, average error, incoherent error, etc. as described above) included in the calibration data of the quantum computers. Since the weights are assigned to different quantum computers (or QPUs), the weights are also referred to as QPU-level weights or external weights in this disclosure.

In some embodiments, the quantum computing service may determine an ensemble result, using the plurality of sets of results from the multiple quantum computers and the QPU-level weights. Various ensemble methods may be employed, e.g., an averaging method, a boosting method, a stacking ensemble method (e.g., provided by the scikit-learn library), etc. For example, in some embodiments, the ensemble result may be a weighted sum of the plurality of results. In some embodiments, the quantum computing service may provide a library to allow a customer to select a pre-prepared ensemble method from the library to be used to calculate the ensemble result. In some embodiments, the quantum computing service may provide the ensemble result, as the final result of the quantum computing algorithm, to the customer.

In some embodiments, within a set of results from an individual quantum computer, the quantum computing service may further determine weights for the different ones of the results. In some embodiments, these weights may be determined based, at least in part on, the calibration data of the individual quantum computer. For example, in some embodiments, the results from a quantum computer may be in the form of bitstrings including a number of bits. The calibration data of the quantum computer may include data representative of readout error (or error rate) or quality of gates between qubits and/or readout error (or error rate) or quality of the qubits of the quantum computer. Thus, the quantum computing service may assign a larger weight to one bit in a bitstring (if the bit is presumably associated with a gate and/or a qubit having a lower readout error (or error rate)), or a smaller weight to another bit (if the bit is presumably associated with a gate and/or a qubit having a higher readout error (or error rate)). To differentiate from the QPU-level weights, these weights are also referred to as qubit-level weights or internal weights in this disclosure. In some embodiments, to determine the ensemble result, the quantum computing service may (1) first determine weighted results for individual ones of the multiple quantum computers, using the original results (or raw results) from the individual ones of the quantum computers and their internal weights, and (2) then determine the final ensemble result, using the weighted results and the QPU-level weights. In some embodiments, these two steps may be combined into one single step, and performed at once.

In some embodiments, the interface of the quantum computing service may provide various options to customers for configuring the ensemble-based execution of quantum computing algorithms. For example, in some embodiments, the interface may provide an option for a customer to select (or enable) the ensemble-based execution for a given quantum computing algorithm. In response, the quantum computing service may determine multiple quantum computers and individual numbers of executions (or runs) for respective quantum computers, and perform the above-described ensemble-based execution of the quantum computing algorithm. In some embodiments, the interface may further allow the customer to specify a required accuracy level, and the quantum computing service may determine the quantum computers and the number of runs to be performed based, at least in part, on the required accuracy level. In some embodiments, the quantum computing service may be able to provide an acknowledgement if the accuracy level is deemed too strict and cannot be fulfilled.

Alternatively, in some embodiments, the interface may allow a customer to select a list of quantum computers for performing an ensemble-based execution for a given quantum computing algorithm. In response, the quantum computing service may determine individual numbers of executions (or runs) for the quantum computers selected by the customer, and use the selected quantum computers to perform the above-described ensemble-based execution of the quantum computing algorithm.

Moreover, in some embodiments, the interface may allow a customer to provide (e.g., upload) a specific ensemble algorithm. In response, after obtaining the results from the quantum computers, the quantum computing service may use the customer's specific ensemble algorithm to combine the results and calculate the final ensemble result for a given quantum computing algorithm.

FIG. 1 shows an example quantum computing service that may use multiple quantum computers and aggregate results from the multiple quantum computers to correct errors in quantum computing results from the multiple quantum computers such that a greater level of accuracy (e.g. lower error rate) is achieved than would be achieved if using each of the quantum computers individually, according to some embodiments. In FIG. 1, service provider network 100 may include quantum computing service 102. In some embodiments, quantum computing service 102 may be implemented using one or more computing devices, such as classical (binary) computers, of service provider network 100. In some embodiments, service provider network 100 may also include other devices such as storage devices, routers, networking devices, etc. and provide other cloud-based services such as database and storage services, networking services, etc. Quantum computing service 102 may provide one or more customers 104, 106, and 108 access to quantum computers of various quantum hardware providers 122, 124, 126, and 128. In some embodiments, customers 104, 106, and 108 may access quantum computing service 102 via network 120, such as a logically isolated connection over a public network, a dedicated private physical connection (not accessible to the public), a public Internet connection, etc. In some embodiments, quantum hardware providers 122, 124, 126, and 128 may include quantum computers implemented based on different quantum computing technologies, such as quantum annealers, trapped ion quantum computer, superconducting quantum computers, photonic devices, etc.

Customers 104, 106, and 108 may encompass any type of client configurable to submit requests to network provider 100. For example, a given customer 104 may include a suitable version of a web browser, or may include a plug-in module or other type of code module configured to execute as an extension to or within an execution environment provided by a web browser. Alternatively, a customer 104 may encompass an application such as a database application (or user interface thereof), 30) a media application, an office application or any other application that may make use of quantum compute service 102, or other network-based service in provider network 100 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 104 may be configured to generate network-based services requests according to a Representational State Transfer (REST)-style network-based services architecture, a document- or message-based network-based services architecture, or another suitable network-based services architecture. In some embodiments, a customer 104 (e.g., a computational client) may be configured to provide access to a compute instance or data storage object in a manner that is transparent to applications implemented on the customer 104 utilizing computational resources provided by the compute instance or storage provided by the storage object.

For purposes of illustration, example interactions between a customer and quantum computing service 102 may be described in the following steps. For example, in some embodiments, customer 104 may access quantum computing service 102 of service provider network 100 via network 120. At "step A" quantum computing service 102 may receive, via interface 133, a quantum computing algorithm from customer 104. In some embodiments, interface 133 may be a graphic interface on a website, an interface for command line input (CLI), an application programming interface (API), a software development kit (SDK), etc. As described above, in some embodiments, the quantum computing algorithm may be in a generic representation, e.g., a generic graphic representation, e.g., developed by customer 104 using an SDK through interface 133 of quantum computing service 102. Alternatively, in some embodiments, the quantum computing algorithm may include one or more pieces of code written in a generic quantum programming language (e.g., cQASM, PyQuil, etc.). In some embodiments, at step "B" quantum computing service 102 may temporarily store the received quantum computing algorithm at task queue(s) 130.

In some embodiments, quantum computing service 102 may determine multiple quantum computers out of a pool of quantum computers from quantum hardware providers 122, 124, 126, and 128. For example, ensemble unit 135 of quantum computing service 102 may obtain information of the quantum computing algorithm, e.g., from task queue(s) 130, and analyze the information to accordingly identify the multiple quantum computers. In some embodiments, the multiple quantum computers may include quantum computers implemented based on different quantum computing technologies, such as quantum annealers, trapped ion quantum computer, superconducting quantum computers, photonic devices, etc. For purposes of illustrations, in this example, the identified quantum computers reside at quantum hardware providers 122, 124, and 126, as indicated in FIG. 1.

At steps "C1", C2", and "C3" quantum computing service 102 may send the quantum computing algorithm, under direction of ensemble unit 135, to respective ones of the identified quantum computers at quantum hardware providers 122, 124, and 126 for execution. As described above, in some embodiments, when the quantum computing algorithm is in a generic representation, quantum computing service 102 may first translate the quantum computing algorithm into different forms or representations (e.g., native gate-level files) native and specific to the quantum hardware of the different selected quantum computers, and then send the native files respectively to the quantum computers at quantum hardware providers 122, 124, and 126, which may be further compiled into executable files (e.g., binary files) at quantum hardware providers 122, 124, and 126 that may be understood and executed directly on the quantum computers. Alternatively, quantum computing service 102 may generate the compiled files, and then send the compiled files to the quantum computers at quantum hardware providers 122, 124, and 126 for execution.

In some embodiments, quantum computing service 102 (e.g., ensemble unit 135) may determine individual numbers of execution (or runs) for the respective quantum computers, and request individual ones of the quantum computers to execute the quantum computing algorithm repeatedly for the determined number of times. In some embodiments, the number of runs for individual ones of the quantum computer may be determined based on various factors. For example, when the cost of usage of one quantum computer is more expensive than another (e.g., because of availability, bandwidth, type of the underlining quantum computing technology, etc.), a lower number of runs may be assigned to the former quantum computer than the latter. In addition, when the calibration data (e.g., the last update time) indicates that one quantum computer is presumably more accurate than another, a higher number of runs may be assigned to the former than the latter. In some embodiments, the quantum computers may execute the quantum computing algorithm in parallel around the same time.

At steps "D1", "D2" and "D3" quantum computing service 102 may receive, at ensemble unit 135, a plurality of sets of results from the quantum computers at quantum hardware provider 122, 124, and 126, for example one set of results from each one of the quantum computers. For a set of results from an individual quantum computer, individual ones of the results may correspond to respective runs of the quantum computing algorithm at the individual quantum computer. Thus, when the quantum computers execute the quantum computing algorithm for different numbers of runs, the number of results from the quantum computers may be different from each other. For purposes of illustration, the original results from the quantum computers are also referred to as raw results in this disclosure.

Figure 2:
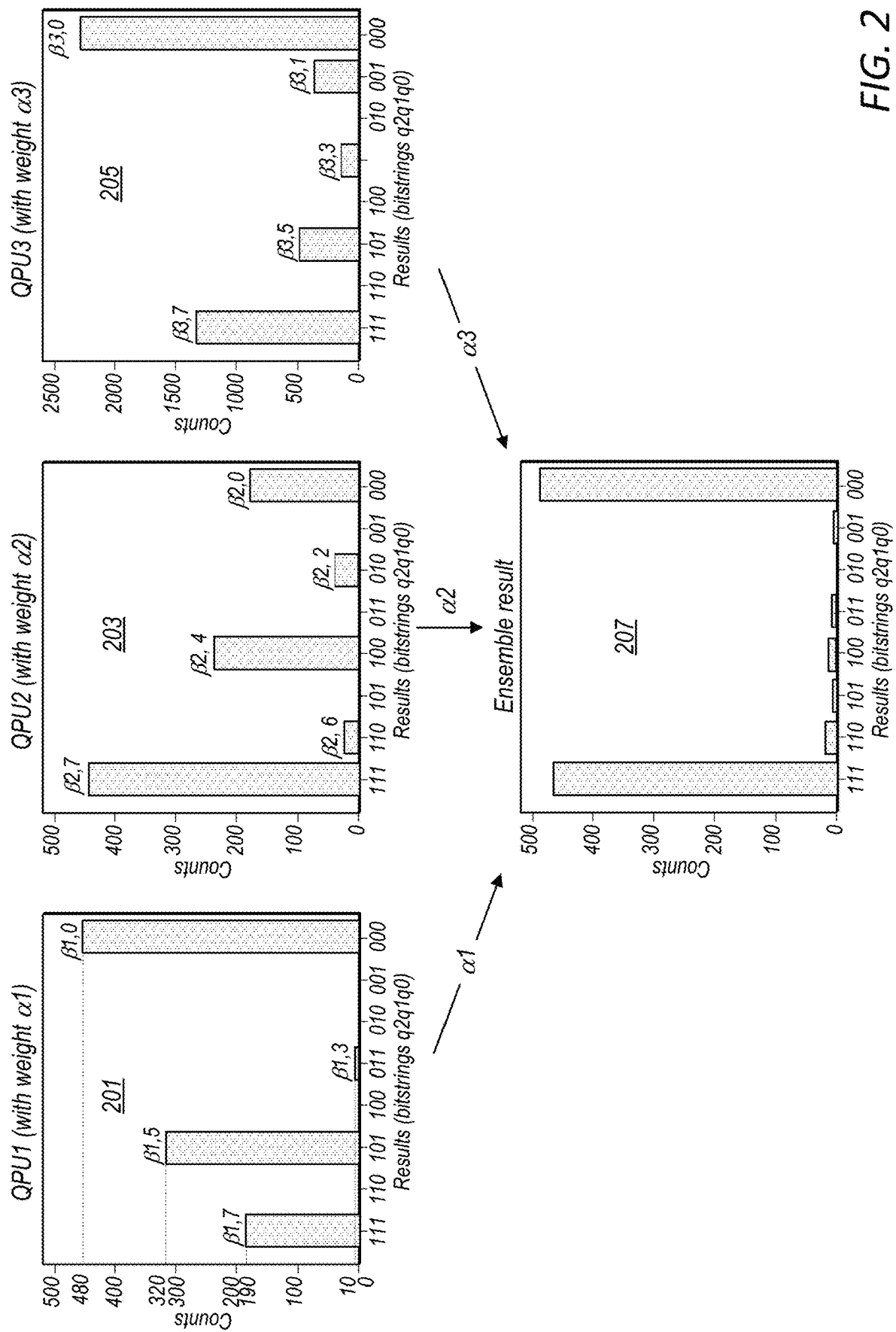
FIG. 2 shows example results from execution of a quantum computing algorithm to implement 3-qubit Greenberger-Horne-Zeilinger (GHZ) states using three quantum computers, according to some embodiments.

Consider the quantum computing algorithm from customer 104 is an algorithm to implement 3-qubit Greenberger-Horne-Zeilinger (GHZ) states. FIG. 2 shows example results from execution of the quantum computing algorithm to implement the 3-qubit Greenberger-Horne-Zeilinger (GHZ) states using three quantum computers (e.g., QPU1, QPU2, and QPU3), according to some embodiments. In some embodiments, QPU1, QPU2, and QPU3 may be implemented using different quantum computing technologies. GHZ states are quantum states representing quantum entanglement of at least three qubits. Because of superposition, each qubit may be zero and one at the same time. However, at measurement, a qubit will collapse into a single state. Thus, given three qubits, "theoretically" there may be 23 or eight different states, each state represented by a 3-bit string of the states of the three qubits. However, the qubits are also entangled with each other, meaning that, when one qubit is measured at zero or one (or collapses to zero or one at measurement), the other two qubits will be measured at the same state as well. Thus, at measurement, ideally there would be only two possible measurement outcomes (or results)—111 and 000—each at a 50% probability.

Figure 3:
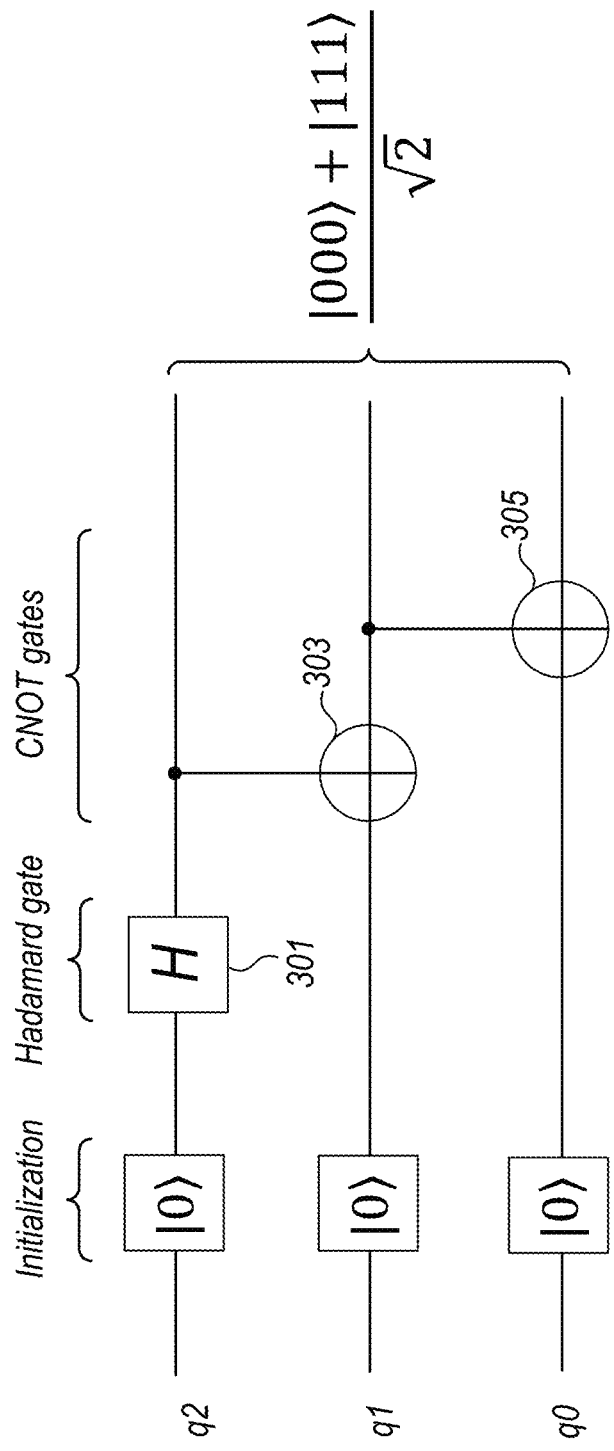
FIG. 3 shows an example quantum circuit for generation of GHZ states, according to some embodiments.

In quantum computing, a quantum computing algorithm is generally represented by a quantum circuit. A quantum circuit is a computational routine consisting of coherent quantum operations on qubits. The quantum circuit may include a set of quantum gates, which may connect qubits and implement operations on the associated (or connected) qubits. FIG. 3 shows an example quantum circuit for generation of GHZ states, according to some embodiments. As shown in FIG. 3, the quantum circuit may include a Hadamard gate (or H gate), two CNOT gates, and initialization operations. A Hadamard gate performs a one-qubit rotation to map a qubit state |0) or |1) to two superposition states 0 and 1 with equal probabilities. A CNOT gate receives a target qubit state and a control qubit state, and flips the target qubit state (e.g., from |0) to |1), or vice versa) if and only if the control qubit state is |1). Thus, in FIG. 3, H gate 301 operates on qubit q2 to convert its state to two superposition states 0 and 1 with equal probabilities. By comparison, CNOT gate 303 uses the output of H gate 301 (after operation of qubit q2) as the control qubit state to flip the state of qubit q1. Similarly, CNOT 305 uses the output of CNOT 303, as the control qubit state, to flip the state of qubit q0.

Referring back to FIG. 2, the figure shows four histograms 201, 203, 205, and 207. Histograms 201, 203, and 205 illustrate the set of results, obtained by quantum computing service 102, from the three quantum computers (i.e., QPU1, QPU2, and QPU3) respectively that are identified by quantum computing service 102 to perform the ensemble-based execution of the quantum computing algorithm. Histogram 207 illustrates the ensemble result determined based on aggregating the results from histograms 201, 203, and 205. In each histogram, the horizontal axis shows results (e.g., 3-bit strings), and the vertical axis shows counts (e.g., the number) of respective results.

As described above, since quantum computers are subject to noise, and thus they may need to be calibrated from time to time. During calibration, the sensors and instruments that implement and measure qubits of a quantum computer may be adjusted, and the quantum computer's properties may be updated. Considering the example in FIGS. 2-3, in some embodiments, quantum computing service 102 may obtain, at ensemble unit 135, calibration data respectively of the three quantum computers QPU1, QPU2, and QPU3, respectively from quantum hardware providers 122, 124, and 126. In some embodiments, the calibration data may be stored at ensemble unit 133, or at a separate data store within service provider network 100 that is accessible to ensemble unit 133. In some embodiments, the calibration data of a quantum computer may include various information, such as a name of the quantum computer, a version of the system of the quantum computer, last update time such as a local time at which the quantum computer was last updated (or calibrated), and data of the qubits and/or gates of the quantum computer, etc. In some embodiments, the data of a qubit may include physical 20) attributes of the qubit (e.g., frequency of the qubit), readout error (or error rate) of the qubit, last update time at which the qubit properties were updated (or calibrated), etc. In some embodiments, the data of a gate may include a name of the gate, a list of qubits on which a gate acts or connects, readout error (or error rate) of the gate, last update time at which the gate properties were updated (or calibrated), etc.

In some embodiments, quantum computing service 102 may determine a weight for respective ones of the different quantum computers. For example, quantum computing service 102 may assign weight a1 to QPU1, a2 to QPU2, and a3 to QPU3. As described above, these weights may be referred to as the QPU-level or external weights. In some embodiments, weights a1, a2, and a3 may be determined based, at least in part, on the calibration data of QPU1, QPU2, and QPU3. For example, in some embodiments, ensemble unit 135 may analyze the calibration data of QPU1, QPU2, and QPU3 to identify their respective last update time, and then determine weights a1, a2, and a3 based on the last calibration time of QPU1, QPU2, and QPU3. For example, when QPU1 was last updated more recently than QPU2, ensemble unit 135 may assign a larger weight to QPU1 than QPU2 (e.g., $\alpha 1 > \alpha 2$). One rationale is that, because QPU1 was more recently updated, it may provide more accurate computational results than QPU2. In some embodiments, a sum of the weights (e.g., $\alpha 1 + \alpha 2 + \alpha 3$) may equal to one.

Further, as indicated in FIG. 2, in some embodiments, the quantum computers QPU1, QPU2, and QPU3 may execute (or run) the quantum computing algorithm repeatedly for a number of times. The number of runs at an individual quantum computer may be indicated by the counts of the results from the individual quantum computer. For example, as indicated in histogram 201 in FIG. 2, the set of results from QPU1 may include four different readings, e.g., 111, 101, 011, and 000. The counts of the four results are respectively 190, 320, 10, and 480. Thus, the total number of runs at QPU1 is 1000 (i.e., 190+320+10+480=1000). Among the 1000 runs, 190 runs give the result of 111, 320 runs give the result of 101, 10 runs give the result of 011, and 480 runs give the result of 000. As described above, results 101 and 011 are known erroneous results that may be caused by noise. Thus, in this example, among the results from QPU1, the erroneous result 101 is even more dominant than the correct result 111. Following the same notation, as indicated by histograms 203 and 205, the numbers of runs at QPU2 and QPU3 are respectively 1000 and 5000. When the numbers of runs at the quantum computers are different, quantum computing service 102 may further perform normalization 20) to scale the number of runs. For example, normalization factors 1/1000, 1/1000, and 1/5000 may respectively be assigned to QPU1, QPU2, and QPU3 to modify the QPU-level weights $\alpha 1$, $\alpha 2$, and $\alpha 3$ to ($\alpha 1/1000$), ($\alpha 2/1000$), and ($\alpha 3/5000$). In some embodiments, the determination of QPU-level weights $\alpha 1$, $\alpha 2$, and $\alpha 3$ may be based also on the number of runs of QPU1, QPU2, and QPU3. For example, quantum computing service 102 may assign a larger QPU-level weight to a quantum computer with a larger number of runs, and a smaller QPU-level weight to another quantum computer with a fewer number of runs (e.g., $\alpha 1$ and $\alpha 2 < \alpha 3$).

Referring back to FIG. 1, in some embodiments, in response to obtaining the plurality of sets of raw results from the quantum computers at quantum hardware providers 122, 124, and 126, ensemble unit 133 of quantum computer service 102 may aggregate the results to determine an ensemble result based on the QPU-level weights. Referring back to the 3-qubit GHZ example in FIGS. 2-3, in some embodiments, the ensemble result may be determined according to equation (1):

$$\varepsilon = \frac{\alpha_1}{1000}\left(\sum_{i=0 \to 7} \text{result}_{1,i} \times \text{count}_{1,i}\right) + \frac{\alpha_2}{1000}\left(\sum_{i=0 \to 7} \text{result}_{2,i} \times \text{count}_{2,i}\right) + \frac{\alpha_3}{5000}\left(\sum_{i=0 \to 7} \text{result}_{3,i} \times \text{count}_{3,i}\right) \quad (1)$$

where $\varepsilon$ represents the ensemble result, $\text{result}_{k,i}$ represents the i-th result out of the eight 3-bit strings from the k-th QPU (e.g., k=1, 2, and 3 for QPU1, QPU2, and QPU3), and $\text{count}_{k,i}$ represents the count corresponding to the i-th result from the k-th QPU. For example, as to QPU1, there are 4 different results out of the eight 3-bit strings, such as $\text{result}_{1,0}$ (i.e., 000) with corresponding $\text{count}_{1,0}$ (i.e., 480), $\text{result}_{1,3}$ (i.e., 011) with corresponding $\text{count}_{1,0}$ (i.e., 10), $\text{result}_{1,5}$ (i.e., 101) with corresponding $\text{count}_{1,5}$ (i.e., 320), and $\text{result}_{1,7}$ (i.e., 111) with corresponding $\text{count}_{1,0}$ (i.e., 190). In other words, according to equation (1), ensemble unit 135 may multiply the QPU-level weights with the results from QPU1, QPU2, and QPU3 to generated QPU-level weighted results, and then add the weighted results to generate the ensemble result.

In addition, in some embodiments, for a set of results from an individual quantum computer, quantum computing service 102 may also determine weights for the respective results in the set. As described above, these weights may be referred to as the qubit-level or internal weights. In the 3-qubit GHZ example in FIG. 2, given the eight 3-bit strings, quantum computing service 102 may assign eight weights to each possible 3-bit reading. As illustrated in histogram 201, since QPU1 has only four different results, only four internal weights are thus displayed, such as weight ($\beta 1,7$) for result 111, ($\beta 1,5$) for result 101, ($\beta 1,3$) for result 011, and ($\beta 1,0$) for result 000. In some embodiments, the internal weights of an individual quantum computer (e.g., ($\beta 1,7$), ($\beta 1,5$), ($\beta 1,3$), and ($\beta 1,0$) of QPU1) may be determined based, at least in part, on the calibration data of the individual quantum computer (e.g., QPU1). As described above, in some embodiments, the calibration data of a quantum computer may include data regarding readout error (or error rate) and last update time of the gates between qubits, and/or readout error (or error rate) and last update time of the qubits within the quantum computer. Thus, in some embodiments, the internal weights ($\beta 1,7$), ($\beta 1,5$), ($\beta 1,3$), and ($\beta 1,0$) may be determined based on the last calibration time of the gates and/or qubits of QPU1. When a gate and/or a qubit was last updated recently, ensemble unit 135 of quantum computing service 102 may assign a weight $\beta$ of a higher value to a bit in the reading associated with the gate and/or the qubit. By comparison, when a gate and/or a qubit was last updated a longer time ago, ensemble unit 135 may assign a weight β of a lower value to a bit in the reading associated with the gate and/or the qubit. Moreover, in some embodiments, when a quantum computer is calibrated, the gates and/or qubits inside the quantum computer may get updated around a same time. As a result, there may be no significant difference as to the last update time among different gates and/or qubits. Thus, in some embodiments, the internal weights (β1,7), (β1,5), (β1,3), and (β1,0) may be determined based on the readout errors (or error rates) of the gates and/or qubits that may represent the quality of the gates and/or qubits.

For example, referring to FIG. 3, when CNOT 305 has an error, the error may mainly propagate to and affect bit 0 (but not bits 2 and 1) in a 3-bit string, since only bit 0 is at the downstream of CNOT 303. As a result, bit 0 may be inclined to have an inconsistent reading from bits 2 and 1 (because the error may affect the entanglement between bit 0 and bits 2 and 1), whilst bits 2 and 1 may still tend to have consistent readings. Thus, a weight of a higher value may be assigned to a result (e.g., 111 and 000) in which bits 2 and 1 have consistent readings (e.g., presumably to be probably a correct result), and a weight of a lower value assigned to a result (e.g., 110 and 001) in which bit 0 has an inconsistent reading from bits 2 and 1 (e.g., presumably to be probably an erroneous result caused by the CNOT 305's error). Similarly, when CNOT 303 is known to have a readout error, the error may mainly propagate to and affect bits 1 and 0 in a 3-bit result. Accordingly, ensemble unit 135 may determine a weight of a lower value to a result in which bits 1 and 0 have consistent readings but bit 2 has a different reading (e.g., presumably to be probably an erroneous result caused by the CNOT 303's error), such as results 100 and 011.

Referring back to FIG. 1, in some embodiments, in response to obtaining the plurality of sets of raw results from the quantum computers (e.g., after steps "D1", "D2", and "D3"), ensemble unit 133 of quantum computer service 102 may first determine a set of weighted results, based on the raw results and the qubit-level (or internal) weights, respectively for QPU1, QPU2, and QPU3. For the 3-qubit GHZ example in FIGS. 2-3, in some embodiments, a set of weighted results for one individual quantum computer (e.g., QPU1) may be determined according to equation (2):

$$\text{count}'_{k,i} = \beta_{k,i} \times \text{count}_{k,i}, \text{ where } i=0 \rightarrow 7, k=1 \rightarrow 3 \quad (2)$$

where $\beta_{k,i}$ represents an internal weight to the i-th raw result of k-th QPU (e.g., QPU1, QPU2, and QPU3), and $\text{count}_{k,i}$ represents the count of the i-th raw result of the k-th QPU. As described above, for QPU1, the counts of the 4 different results 111, 101, 011, and 000 are respectively 190 (with an internal weight (β1,7)), 320 (with an internal weight (β1,5)), 10 (with an internal weight (β1,3)), and 480 (with an internal weight (β1,0)). And $\text{count}'_{k,i}$ represents the weighted count of the i-th raw result of the k-th QPU.

After the weighted results (e.g., the weighted counts of the different results) are determined for individual ones of the quantum computers, ensemble unit 133 may then determine the ensemble result of the quantum computing algorithm, e.g., according to equation (3) (a modified version of equation (2)):

$$\varepsilon = \frac{\alpha_1}{1000}\left(\sum_{i=0 \rightarrow 7}\text{result}_{1,i} \times \text{count}'_{1,i}\right) + \quad (3)$$

-continued
$$\frac{\alpha_2}{1000}\left(\sum_{i=0 \rightarrow 7}\text{result}_{2,i} \times \text{count}'_{2,i}\right) + \frac{\alpha_3}{5000}\left(\sum_{i=0 \rightarrow 7}\text{result}_{3,i} \times \text{count}'_{3,i}\right)$$

Thus, if equation (2) is brought into equation (3), equation (3) may be re-written into equation (4):

$$\varepsilon = \frac{\alpha_1}{1000}\left(\sum_{i=0 \rightarrow 7}\text{result}_{1,i} \times \beta_{1,i} \times \text{count}_{1,i}\right) + \quad (4)$$
$$\frac{\alpha_2}{1000}\left(\sum_{i=0 \rightarrow 7}\text{result}_{2,i} \times \beta_{2,i} \times \text{count}_{2,i}\right) +$$
$$\frac{\alpha_3}{5000}\left(\sum_{i=0 \rightarrow 7}\text{result}_{3,i} \times \beta_{3,i} \times \text{count}_{3,i}\right)$$

Assuming that the plurality of sets of results from individual quantum computers QPU1, QPU2, and QPU3 are associated with respective error probabilities, the ensemble result from equations (3) or (4) may be associated with an error probability that is less than the respective error probabilities of the individual quantum computers. As indicated in histogram 207 in FIG. 2, the ensemble result may include mainly 111 and 000 approximately at 50-50% probabilities, thus closer to the ideal result when compared to the results from individual QPUs shown in histograms 201, 202, and 203. Referring back to FIG. 1, in some embodiments, upon determination of the ensemble result, at step "E" ensemble unit 133 may provide the ensemble result, as a final result of the quantum computing algorithm, to interface 133. At step "F" quantum computing service 102 may provide, via interface 133, the final ensemble result to customer 104.

Figure 4:
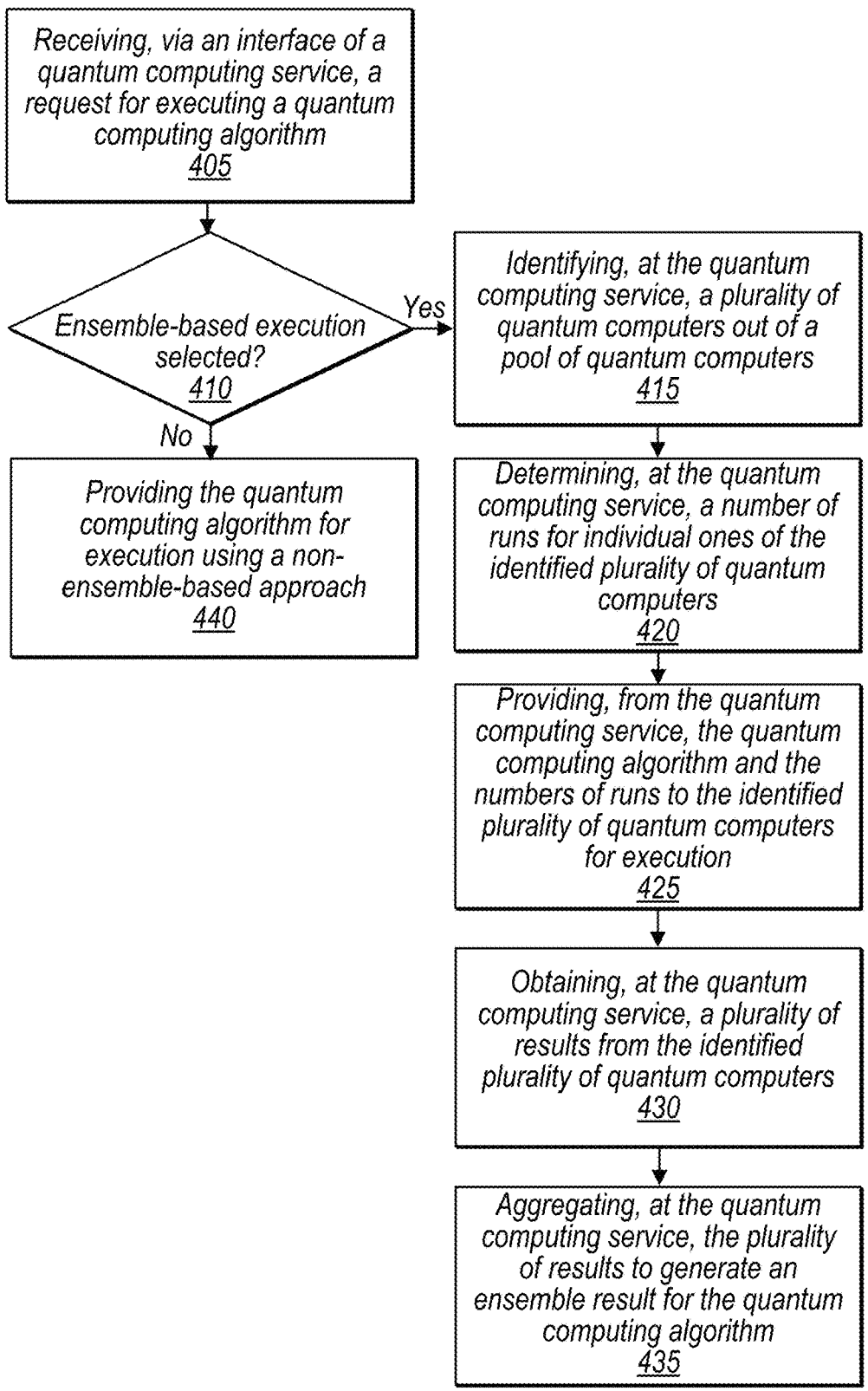
FIG. 4 shows a simplified flowchart illustrating an example method for determining an ensemble result of a quantum computing algorithm using multiple quantum computers, according to some embodiments.

FIG. 4 shows a simplified flowchart illustrating an example method for determining an ensemble result of a quantum computing algorithm using multiple quantum computers, according to some embodiments. As indicated in FIG. 4, a request may be received from a customer at a quantum computing service, e.g., via an interface of the quantum computing service, for executing a quantum computing algorithm, as indicated in block 405. As described above, in some embodiments, the interface (e.g., like interface 133 of quantum computing service 102) may be a graphic interface on a website, an interface for command line input (CLI), an application programming interface (API), a software development kit (SDK), etc. Further, in some embodiments, the quantum computing algorithm may be in a generic representation, e.g., a generic graphic representation or a generic quantum programming language (e.g., cQASM, PyQuil, etc.). As described above, the quantum computing service may translate the quantum computing algorithm to native files (which may be further compiled at quantum computers) or compiled files (which may be executed directly on the quantum computers).

As described above, in some embodiments, the interface of the quantum computing service may allow a customer to select whether or not the customer would like to use multiple quantum computers to perform an ensemble-based execution of the quantum computing algorithm, as indicated in block 410. In response to receiving an indication via the interface that the ensemble-based execution is not selected, the quantum computing service may provide the quantum computing algorithm for execution using a non-ensemble-based approach, as indicated in block 440. For example, the quantum computing algorithm my be provided to only one quantum computer for execution, and the result from this quantum computer may be provided to the customer as the final result of the quantum computing algorithm.

Conversely, in response to receiving an indication via the interface that the ensemble-based execution is selected, the quantum computing service may the quantum computing service may identify the plurality of quantum computers (e.g., like QPU1, QPU2, and QPU3) out of a pool of quantum computers from quantum hardware providers, as indicated in block 415. In some embodiments, the identified plurality of quantum computers may include quantum computers implemented using different quantum computing technologies, such as quantum annealers, superconducting quantum computers, trapped ion quantum computers, photonic devices, etc. For example, QPU1, QPU2, and QPU3 may be implemented using different quantum computing technologies from each other. In addition, in some embodiments, the quantum computing service may also determine a number of runs for individual ones of the identified quantum computers to execute the quantum computing algorithm repeatedly for a number of times (e.g., like 1000 runs for QPU1, 1000 runs for QPU2, and 5000 runs for QPU3), as indicated in block 420. In some embodiments, the interface may allow the customer to specify a required computational accuracy level, and the quantum computing service may determine the plurality of quantum computers and/or the number of runs based 30) on the accuracy level. In some embodiments, when the required accuracy level is too strict to meet, the quantum computing service may provide an acknowledgement indicating that the accuracy level cannot be fulfilled. In some embodiments, the plurality of quantum computers may be identified also based on other factors such as availability, cost, bandwidth, etc. of the quantum computers.

In some embodiments, once the plurality of quantum computers and the numbers of runs are determined, the quantum computing service may provide the quantum computing algorithm (e.g., in the form of native files or compiled files) and the number of runs to the identified quantum computers for execution, as indicated in block 425. As described above, in some embodiments, when the quantum computing algorithm is in a generic representation, the quantum computing service may first translate the quantum computing algorithm into native files (e.g., native gate-level files), and then send the native files to the quantum computers for compilation. Alternatively, the quantum computing service may compile the quantum computing algorithm locally, and then send the compiled files to the quantum computers for execution.

In some embodiments, a plurality of results may be obtained at the quantum computing service from the plurality of quantum computers, as indicated in block 430. As described above, in some embodiments, the quantum computing service may obtain one set of results from one individual quantum computer, and the set of results may further include multiple results, one corresponding to one iteration of execution of the quantum computing algorithm at the individual quantum computer, (e.g., like the respective sets of results from QPU1, QPU2, and QPU3 shown in the histograms in FIG. 2).

In some embodiments, the quantum computing service may aggregate the plurality of results from the plurality of quantum computers to generate an ensemble result, as the final result, of the quantum computing algorithm, as indicated in block 435. As described above, in some embodiments, the quantum computing service may determine QPU-level weights for respective quantum computers. As described above, in some embodiments, the QPU-level weights may be determined based, at least in part, on the calibration data of the quantum computers. For example, in some embodiments, the calibration data of the quantum computers may include data indicating the last update time when the quantum computers were last calibrated, assuming that the calibration time indicates the calibration quality of the quantum computers. In some embodiments, the calibration data may include calibration metrics such as readout error, average error, incoherent error, etc. Accordingly, the quantum computing service may analyze the calibrate data and determined the QPU-level weight according to the last update time of the quantum computers and/or the calibration metrics described above. In some embodiments, the ensemble may be calculated using the raw results from the quantum computers and the QPU-level weights, e.g., according to equation (1). For example, the quantum computing service may multiply the QPU-level weights with the raw results from QPU1, QPU2, and QPU3 to generated QPU-level weighted results, and then add the weighted results to generate the ensemble result. In some embodiments, the quantum computing service may provide the ensemble result, as the final result, of the quantum computing algorithm to the consumer.

In some embodiments, the quantum computing service may also determine qubit-level or internal weights for respective results in the set of results from individual ones of the quantum computers. As described above, in some embodiments, internal weights for an individual quantum computer may be determined based on the calibration data regarding the gates and/or qubits of the individual quantum computer. For example, the calibration data may include data indicating the last update time when the gates and/or qubits inside the quantum computer were last calibrated. Also, the calibration data may include data including the readout errors (or error rates) of the gates and/or qubits of the quantum computer. Accordingly, the quantum computing service may assign the internal weights to the respective results of the quantum computer according to the last update time and/or readout errors (or error rates) of the gates and/or qubits of the quantum computer. For example, the quantum computing service may assign a larger weight to bitstring(s) that are preassembly less affected by the readout error of a gate and/or a qubit, and a smaller weight to bitstring(s) that are preassembly primarily affected by the readout error of the gate and/or qubit.

In some embodiments, to calculate the ensemble result, the quantum computing service may first determine weighted results for individual ones of the quantum computers, using the raw results and the qubit-level (or internal) weights, e.g., according to equation (2), and then determine the ensemble result using the weighted results and the QPU-level weights, e.g., according to equation (3) or (4).

Figure 5:
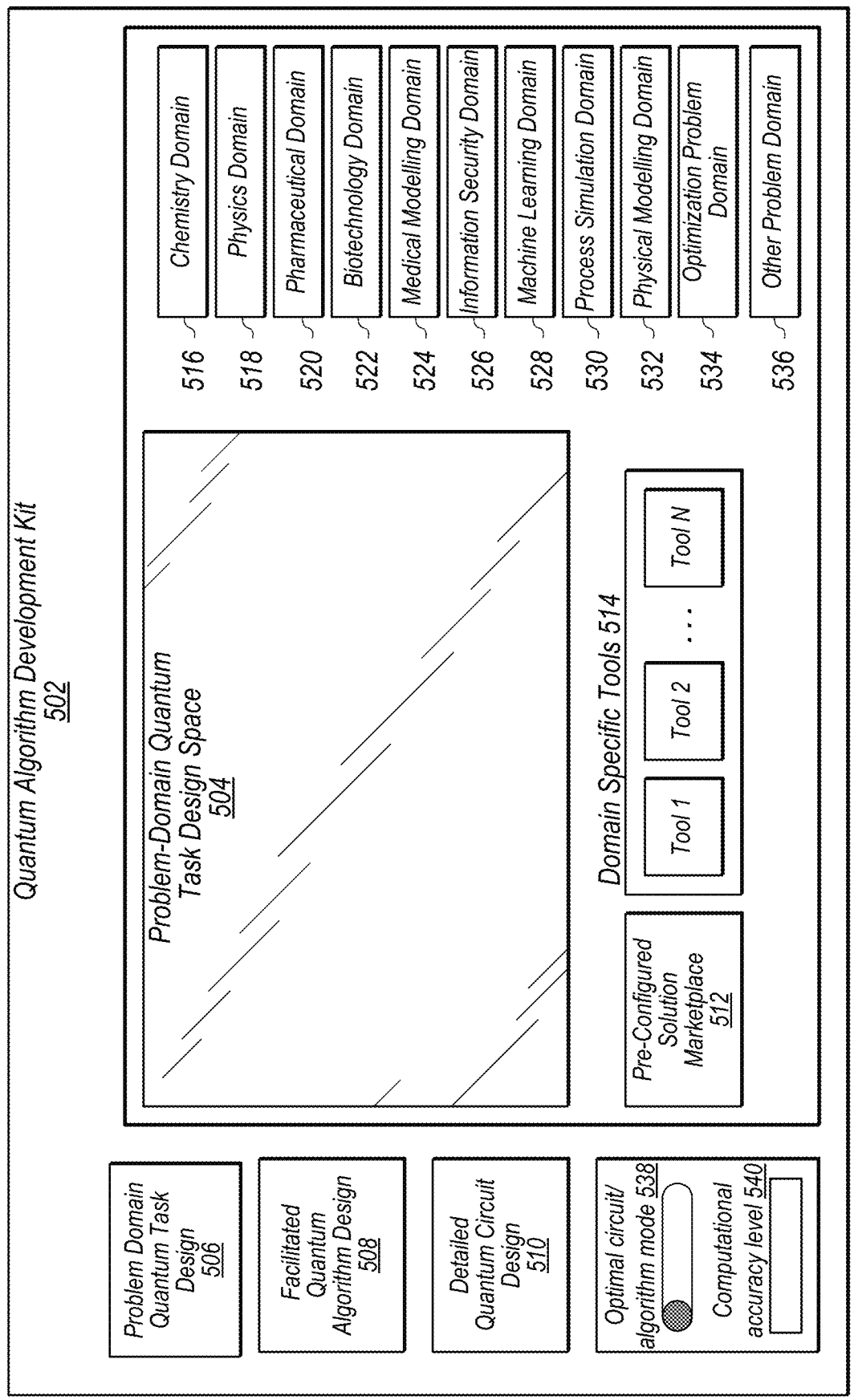
FIG. 5 illustrates an example quantum computing service displaying a quantum algorithm development kit interface, according to some embodiments.

FIG. 5 illustrates an example quantum computing service displaying a quantum algorithm development kit interface, according to some embodiments. In some embodiments, a quantum algorithm development kit 502 may provide a customer with multiple problem domains to select from when a problem-domain design paradigm is selected. For example, FIG. 5 illustrates an interface of quantum algorithm development kit 502 with problem domain quantum task design button 506 selected. The quantum algorithm development kit presents a quantum task design space 504 along with a plurality of problem domains for a customer to select from. For example, a less experienced customer may select a problem-domain based paradigm. For example, the customer may select problem domain quantum task button 506 to display a problem-domain based interface for designing a quantum circuit. For example, quantum algorithm development kit 502 provides problem domain options for:

a chemistry domain 516, a physics domain 518, a pharmaceutical domain 520, a biotechnology domain 522, a medical modelling domain 524, an information security domain 526, a machine learning domain 528, a process simulation domain 530, a physical modelling domain 532, an optimization problem domain 534 and/or other problem domains 536. The problem-domain based interface may include pre-configured quantum algorithms designed for performing particular functions associated with one or more respective problem domains. A customer of the quantum computing service may select an applicable problem-domain for a problem to be solved by the customer. As another example, an intermediate level customer may select a facilitated quantum algorithm design paradigm. The facilitated quantum algorithm design paradigm may be configured such that the quantum computing service facilitates design of a quantum circuit using customer configurable building blocks without the customer being required to understand all the nuances of designing a quantum circuit. For example, a customer may select facilitated quantum algorithm design button 508 to display a quantum algorithm based interface for designing a quantum circuit. The quantum algorithm based interface may include pre-configured quantum logic elements configured to be arranged with one another to form a quantum algorithm, wherein a customer of the quantum computing service selects and/or arranges the pre-configured quantum logic elements to define a particular quantum algorithm to be performed by the quantum computing service as the quantum 20) computing object. Additionally, as another example, a more experienced customer may select a detailed quantum circuit based design paradigm. For example, a quantum circuit design based paradigm may give the customer greater control to customize parameters of a quantum circuit, but may also require the customer to have greater knowledge about quantum computers in order to be able to successfully design a quantum circuit using the quantum circuit based design paradigm. For example, a customer may select detailed quantum circuit design button 510 to display a quantum circuit based interface for designing a quantum circuit. The quantum circuit based interface may include quantum operators and connectors, wherein a customer of the quantum computing service combines the quantum operators and connectors to define a particular quantum circuit to be executed by the quantum computing service as a quantum computing object. Note that the problem domains 30) shown in FIG. 5 are provided as example problem domains that may be supported by a quantum algorithm development kit 502 and should not be interpreted as an exhaustive list of all problem domains that may be supported.

A quantum algorithm development kit 502 may be configured to provide a customer with domain specific design tools 514 based on which of the problem domains is selected. For example, if the chemistry domain 516 is selected, domain specific tools 514 may include pre-configured quantum algorithms typically used to solve chemistry related problems. In a similar manner, if the physics domain 518 is selected, domain specific tools 514 may include pre-configured quantum algorithms typically used to solve physics related problems. If other ones of the problem domains are selected, the domain specific tools 514 may be adjusted accordingly to include pre-configured quantum algorithms useful for solving problems in a given selected problem domain.

In some embodiments, selecting a particular one of the tools of the domain specific tools 514 may cause a pre-configured quantum algorithm element to be added to the quantum object (e.g., quantum task/algorithm/circuit) being designed in quantum task design space 504. The customer may then modify the pre-configured quantum algorithm element, arrange it with other pre-configured quantum algorithm elements to define the quantum object, or provide input parameters or other parameters to the pre-configured quantum algorithm element or the overall quantum object being defined.

In some embodiments, a customer may save a quantum object designed in quantum task design space 504 for later use. Also, in some embodiments, a customer may contribute a quantum object designed in quantum design space 504 to a sharing application, such as a marketplace that enables other customers of the quantum computing service to use the quantum object. For example, a chemistry customer may define a quantum object for determining an energy state for a particular molecule and may select pre-configured solution marketplace button 512 to submit the quantum object for determining the energy state for the particular molecule to a shared marketplace. This may allow other customers of the quantum computing service to use the already defined quantum object to solve similar problems. Also, in some embodiments, the customer may be compensated when another customer uses the customer's pre-defined quantum object. In other embodiments a pre-configured solution marketplace may be open source, such that the customer grants access to the customer's pre-defined quantum object with the expectation of being able to access other quantum objects defined by other customers to solve other problems, such as determining energy states of other molecules.

In some embodiments, a customer may select a pre-defined quantum object from a pre-configured solution marketplace and may further modify or combine the pre-defined quantum object with other elements to form a new quantum object. This may be done in quantum task design space 504. The customer may then cause the modified quantum object to be executed on a quantum computer and/or provide the modified quantum object back to the pre-configured solution marketplace.

In some embodiments, the interface of quantum algorithm development kit 502 may provide a customer the option to select and de-select an ensemble-based execution for a quantum computing algorithm, e.g., a quantum computing algorithm developed by the customer using quantum algorithm development kit 502. For example, quantum algorithm development kit 502 may include a slide bar 538 for optimal circuit/algorithm mode. By toggling the slide bar, a customer may turn on (i.e., select or enable) or turn off (i.e., de-select or disable) the ensemble-based execution. In some embodiments, quantum algorithm development kit 502 may further provide a customer an option to specify a required computational accuracy level 540 for the ensemble-based execution of a quantum computing algorithm. For example, a customer may type a number (e.g., 0.95) in the window of computational accuracy level 540, which may represent a confidence level (e.g., 95%) of the ensemble result of the quantum computing algorithm. As described in FIG. 4, in response to the selection of the ensemble-based execution and/or the required accuracy level, the quantum computing service may accordingly determine multiple quantum computers and associated numbers of runs for the quantum computers (e.g., based on the required computational accuracy level), use the multiple quantum computers to execute the quantum computing algorithm repeatedly for a number of times, and aggregate the results from the multiple quantum computers to generate an ensemble result as the final result of the quantum computing algorithm for the customer.

Figure 6:
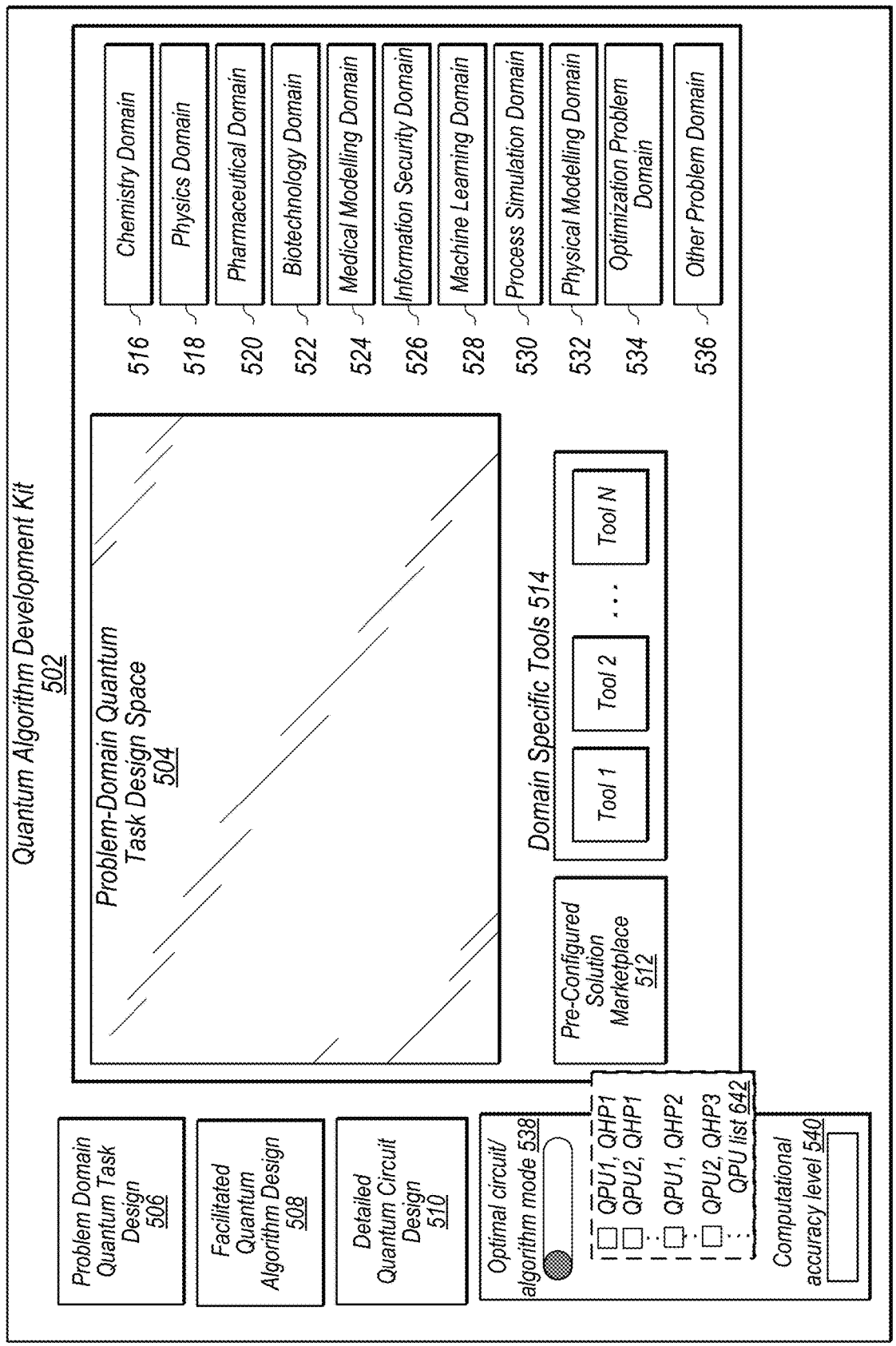
FIG. 6 illustrates another example quantum computing service displaying a quantum algorithm development kit interface, according to some embodiments.

FIG. 6 illustrates another example quantum computing service displaying a quantum algorithm development kit interface, according to some embodiments. In some embodiments, the interface illustrated in FIG. 6 may be substantially similar to that of FIG. 5. However, unlike FIG. 5, when a customer selects an ensemble-based execution for a quantum computing algorithm, e.g., by toggling the slide 538, a list 642 of available quantum computers may pop up to allow the customer to select a list of quantum computers (e.g., by checking the checkboxes) to be used to perform the ensemble-based execution.

Figure 7:
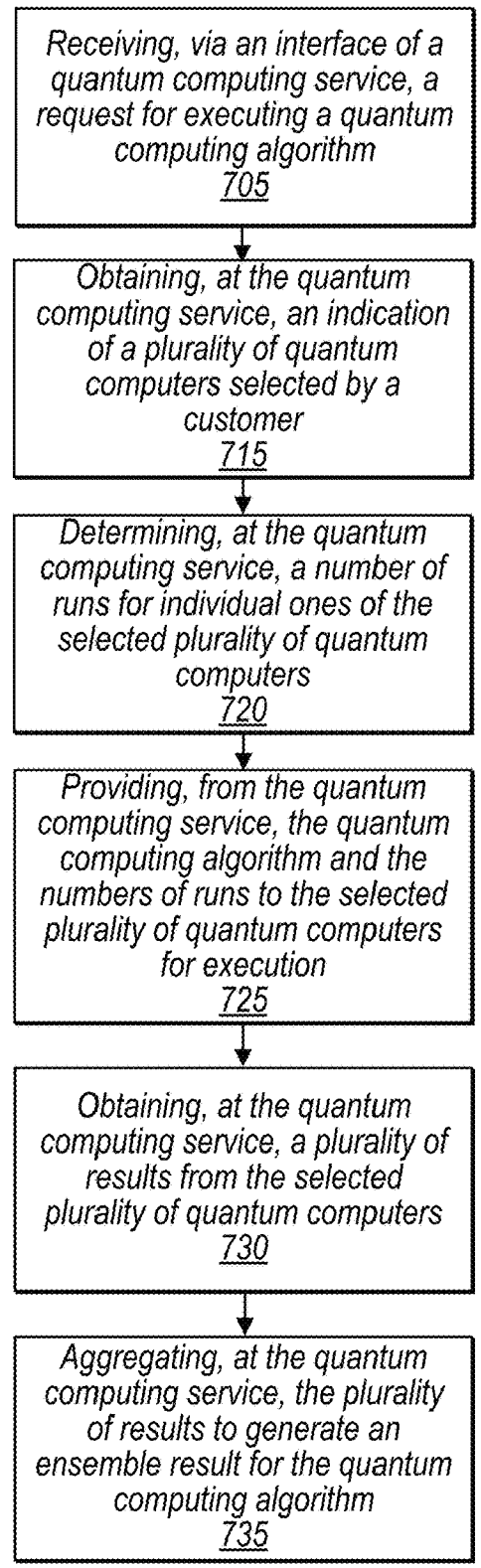
FIG. 7 shows another simplified flowchart illustrating another example method for determining an ensemble result of a quantum computing algorithm using multiple quantum computers, according to some embodiments.

FIG. 7 shows a simplified flowchart illustrating another example method for determining an ensemble result of a quantum computing algorithm using multiple quantum computers, according to some embodiments. As indicated in FIG. 7, a request may be received from a customer at a quantum computing service, e.g., via an interface of the quantum computing service, for executing a quantum computing algorithm, as indicated in block 705. As described above, in some embodiments, the interface of the quantum computing service may allow the customer to select (or enable) or de-select (or disable) an ensemble-based execution for the quantum computing algorithm, e.g., using the slide bar 538 in FIG. 6. When an ensemble-based execution is selected, the customer may further select a plurality of quantum computers to be used to perform the ensemble-based execution, e.g., by using drop-down menu 642. Thus, in response to receiving an indication that the ensemble-based execution is selected, the quantum computing service may obtain an indication of a plurality of quantum computers that is selected by the customer, as indicated in block 715. In some embodiments, the quantum computing service may detect a number of runs for individual ones of the selected quantum computers, as indicated in block 720. The quantum computing service may then provide the quantum computing algorithm and the numbers of runs to the selected quantum computers, as indicated in block 725. In return, the quantum computing service may obtain a plurality of results from the selected plurality of quantum computers, as indicated in block 730. In some embodiments, the quantum computing service may aggregate the plurality of results to calculate an ensemble result as the final result for the quantum computing algorithm, as described above, as indicated in block 735.

Figure 8:
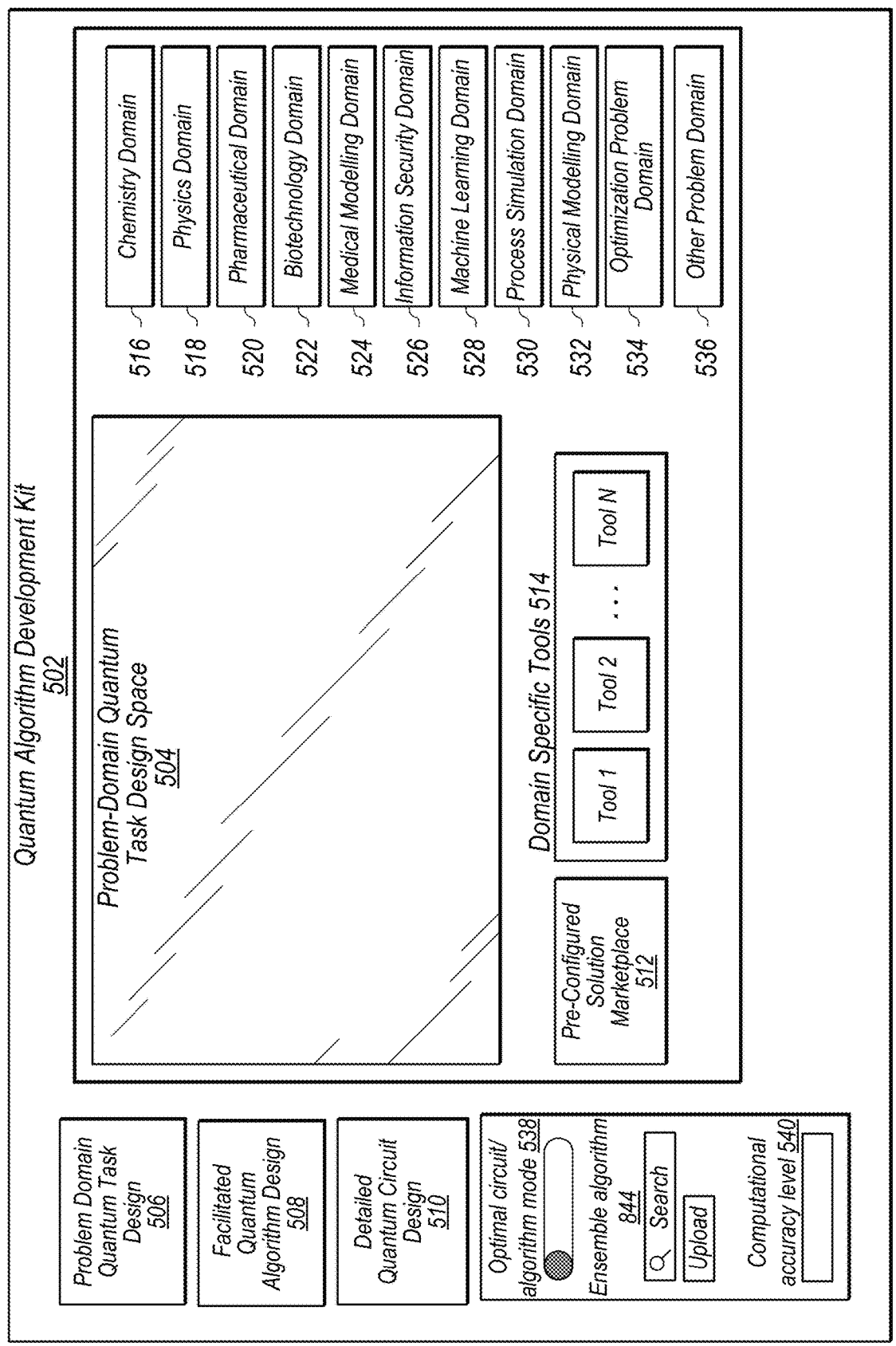
FIG. 8 illustrates yet another example quantum computing service displaying a quantum algorithm development kit interface, according to some embodiments.

FIG. 8 illustrates yet another example quantum computing service displaying a quantum algorithm development kit interface, according to some embodiments. In some embodiments, the interface illustrated in FIG. 7 may be substantially similar to the interfaces displayed in FIGS. 5-6. However, as indicated in FIG. 8, in some embodiments, quantum algorithm development kit 502 may further provide a dialog window 844 to allow a customer to provide (e.g., upload) a specific ensemble algorithm to be used for determining the ensemble result. The specific ensemble algorithm may be developed by the customer him/herself, or may be a pre-prepared ensemble algorithm selected by the customer from an algorithm library of the quantum computing service.

Figure 9:
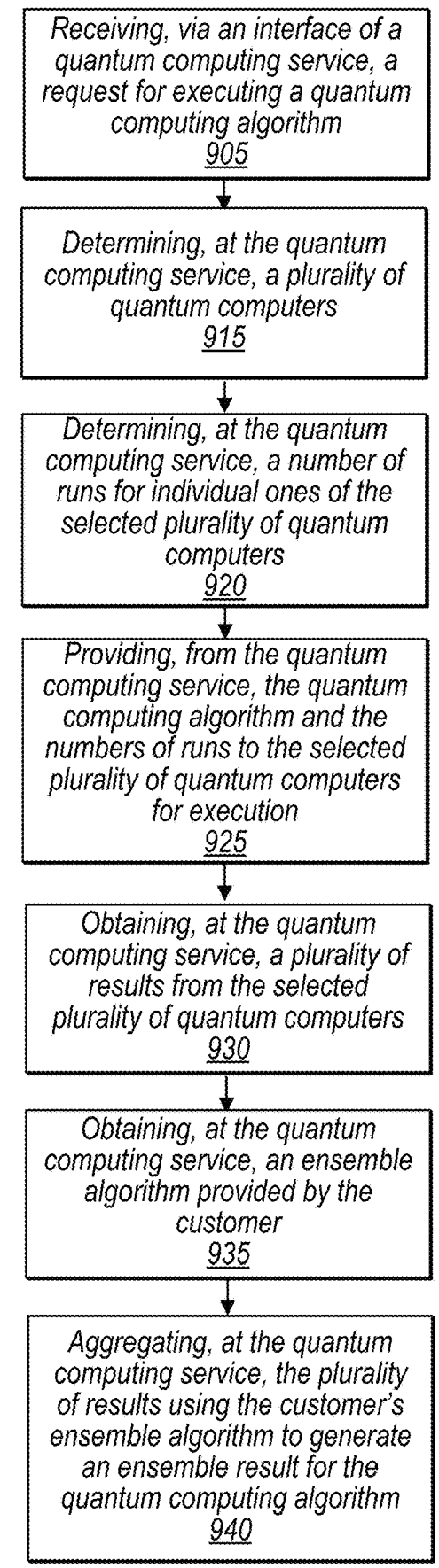
FIG. 9 shows a simplified flowchart illustrating yet another example method for determining an ensemble result of a quantum computing algorithm using multiple quantum computers, according to some embodiments.

FIG. 9 shows a simplified flowchart illustrating yet another example method for determining an ensemble result of a quantum computing algorithm using multiple quantum computers, according to some embodiments. As indicated in FIG. 9, a request may be received from a customer at a quantum computing service, e.g., via an interface of the quantum computing service, for executing a quantum computing algorithm, as indicated in block 905. As described above, in some embodiments, the interface of the quantum computing service may allow the customer to select (or enable) or de-select (or disable) an ensemble-based execution for the quantum computing algorithm, e.g., using the slide bar 538 in FIG. 6. When an ensemble-based execution is selected, the quantum computing service may obtain an indication of the plurality of quantum computers selected by the customer, as indicated in block 915. As described above, in some embodiments, the quantum computing service may detect a number of runs for individual ones of the selected quantum computers, as indicated in block 920. The quantum computing service may provide the quantum computing algorithm and the numbers of runs to the selected quantum computers, as indicated in block 925. In return, the quantum computing service may obtain a plurality of results from the selected plurality of quantum computers, as indicated in block 930. In some embodiments, the interface of the quantum computing service may provide an option for the customer to provide a specific ensemble algorithm, e.g., using the dialog window 844 in FIG. 8. Thus, in some embodiments, the quantum computing service may obtain the specific ensemble algorithm provided by the customer, as indicated in block 935. In some embodiments, the quantum computing service may aggregate the plurality of results, using the customer's specific ensemble algorithm, to calculate an ensemble result as the final result for the quantum computing algorithm, as indicated in block 940. Note that since the ensemble algorithm is provided by the customer, the aggregation in block 940 may or may not be the same as what is described above, e.g., with regards to equations (1)-(4).

Note that FIGS. 1-9 are provided merely as examples for purposes of illustration, and shall not limit the scope of the disclosure. Thus, for example, in some embodiments, an interface of a quantum computing service may include less or more of the different options illustrated in FIGS. 5-6 and 8, and a method to perform the ensemble-based execution of a quantum computing algorithm may include less or more of the steps or operations describes in FIGS. 4, 7, and 9.

Figure 10:
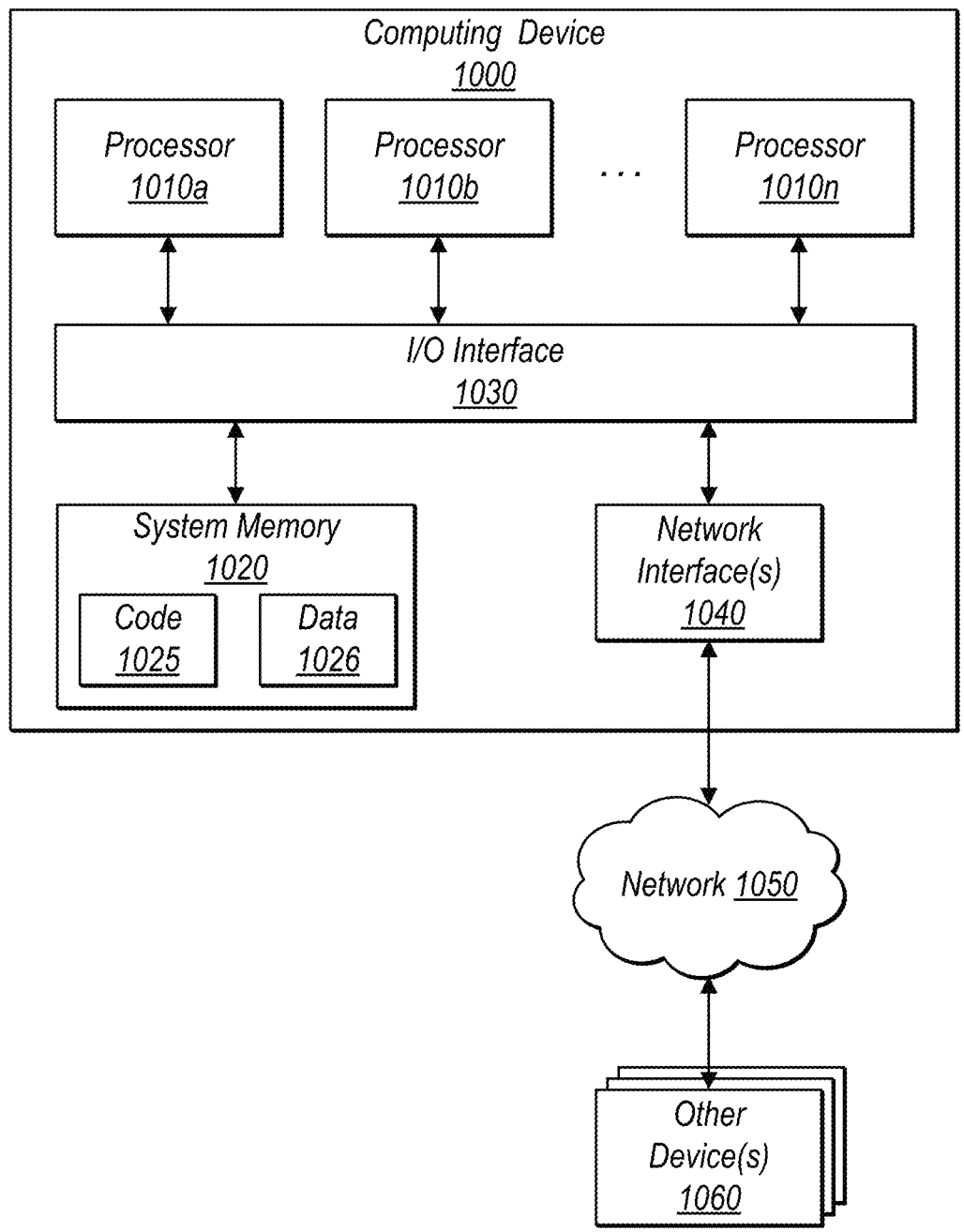
FIG. 10 is a block diagram illustrating an example classical computing device that may be used in at least some embodiments.

FIG. 10 illustrates such a general-purpose computing device 1000 as may be used in any of the embodiments described herein. In the illustrated embodiment, computing device 1000 includes one or more processors 1010 coupled to a system memory 1020 (which may comprise both non-volatile and volatile memory modules) via an input/output (I/O) interface 1030. Computing device 1000 further includes a network interface 1040 coupled to I/O interface 1030.

In various embodiments, computing device 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some implementations, graphics processing units (GPUs) may be used instead of, or in addition to, conventional processors.

System memory 1020 may be configured to store instructions and data accessible by processor(s) 1010. In at least some embodiments, the system memory 1020 may comprise both volatile and non-volatile portions; in other embodiments, only volatile memory may be used. In various embodiments, the volatile portion of system memory 1020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1020 as code 1025 and data 1026.

In some embodiments, I/O interface 1030 may be configured to coordinate I/O traffic between processor 1010, system memory 1020, and any peripheral devices in the device, including network interface 1040 or other peripheral interfaces such as various types of persistent and/or volatile storage devices. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other devices 1060 attached to a network or networks 1050, such as other computer systems or devices as illustrated in FIG. 1 through FIG. 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-20) transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1000 as system memory 1020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices configured to implement a quantum computing service to allow access to a pool of quantum computers, wherein the quantum computing service is configured to:
   receive, from a customer, a quantum computing algorithm requested to be executed;
   provide the quantum computing algorithm to a plurality of quantum computers out of the pool of quantum computers for execution;
   obtain a plurality of results from the plurality of quantum computers, wherein individual sets of results of the plurality of results from individual ones of the plurality of quantum computers are associated with respective error probabilities;

aggregate the plurality of results to generate a final
result for the quantum computing algorithm, wherein
the final result is associated with an error probability
that is less than the respective error probabilities of
the individual quantum computers; and
provide the final result to the customer.

2. The system of claim 1, wherein the plurality of quantum computers includes multiple quantum computers that are implemented using different quantum computing technologies.

3. The system of claim 2, wherein the plurality of quantum computers includes at least one of: a quantum annealer, a superconducting quantum computer, a trapped ion quantum computer, or a photonic device.

4. The system of claim 1, wherein to aggregate the plurality of results, the quantum computing service is configured to:
determine a plurality of weights respectively for individual ones of the plurality of quantum computers;
multiply respective ones of the weights with respective ones of the plurality of results to generate a plurality of weighted results; and
add respective ones of the weighted results to generate the final result.

5. The system of claim 4, wherein the respective ones of the plurality of weights are determined based, at least in part, on a plurality of calibration data respectively of the individual ones of the plurality of quantum computers.

6. A method, comprising:
receiving, via an interface of a quantum computing service that is implemented using one or more computing devices, a request for executing a quantum computing algorithm;
providing, from the quantum computing service, the quantum computing algorithm to a plurality of quantum computers for execution;
obtaining, at the quantum computing service, a plurality of results from the plurality of quantum computers;
aggregating, at the quantum computing service, the plurality of results to generate an ensemble result for the quantum computing algorithm, wherein the ensemble result is associated with an error probability that is less than the respective error probabilities of individual ones of the plurality of quantum computers; and
providing, via the interface of the quantum computing service, the ensemble result.

7. The method of claim 6, further comprising:
prior to providing the quantum computing algorithm to the plurality of quantum computers for execution, identifying the plurality of quantum computers out of a pool of quantum computers.

8. The method of claim 7, wherein the plurality of quantum computers includes multiple quantum computers that are implemented using different quantum computing technologies including at least one of: a quantum annealer, a superconducting quantum computer, a trapped ion quantum computer, or a photonic device.

9. The method of claim 6, wherein the plurality of quantum computers executes the quantum computing algorithm in parallel.

10. The method of claim 6, wherein providing the quantum computing algorithm to the plurality of quantum computers for execution comprises:
providing a plurality of values respectively to the individual ones of the plurality of quantum computers; and
requesting the individual ones of the plurality of quantum computers to execute the quantum computing algorithm repeatedly for a specific number of times indicated by respective ones of the plurality of values.

11. The method of claim 10, further comprising:
obtaining a plurality of calibration data respectively of the individual ones of the plurality of quantum computers; and
determining a plurality of first-level weights respectively for the individual ones of the plurality of quantum computers based on at least one of (1) the plurality of calibration data, or (2) the number of times for which the individual ones of the plurality of quantum computers repeatedly execute the quantum computing program.

12. The method of claim 11, wherein aggregating the plurality of results to generate the ensemble result comprises:
determining a plurality of weighted results using the plurality of first-level weights and the plurality of results obtained from the plurality of quantum computers; and
determining the ensemble result using the plurality of weighted results.

13. The method of claim 11,
wherein the calibration data for the individual quantum computer further includes data indicating at least one of (1) a time when a gate of the individual quantum computer was last updated or (2) a readout error of the gate of the individual quantum computer,
wherein the result obtained from an individual quantum computer includes multiple results corresponding to the repeated executions of the quantum computing algorithm at the individual quantum computer,
wherein the method further comprises:
for the multiple results obtained from the individual quantum computer,
determining multiple second-level weights respectively for respective ones of the multiple results based on at least one of (1) the time when the gate of the individual quantum computer was last updated or (2) the readout error of the gate of the individual quantum computer; and
determining multiple second-level weighted results using the multiple second-level weights and the multiple results, and
wherein aggregating the plurality of results to generate the ensemble result comprises:
determining a plurality of first-level weighted results using the plurality of first-level weights and the plurality of second-level weighted results; and
determining the ensemble result using the plurality of first-level weighted results.

14. One or more non-transitory computer readable media storing program instructions that, when executed on or across one or more processors, cause the one or more processors to:
receive, via an interface, a request for executing a quantum computing algorithm;
provide the quantum computing algorithm to a plurality of quantum computers for execution;
obtain a plurality of results from the plurality of quantum computers;
aggregate the plurality of results to generate an ensemble result for the quantum computing algorithm, wherein the ensemble result is associated with an error probability that is less than the respective error probabilities of individual ones of the plurality of quantum computers; and providing, via the interface of the quantum computing service, the ensemble result.

15. The one or more non-transitory computer readable media of claim 14, wherein the program instructions further cause the one or more processors to:
 prior to provide the quantum computing algorithm to the plurality of quantum computers for execution, identify the plurality of quantum computers out of a pool of quantum computers.

16. The one or more non-transitory computer readable media of claim 15, wherein the plurality of quantum computers includes multiple quantum computers that are implemented using different quantum computing technologies, including at least one of: a quantum annealer, a superconducting quantum computer, a trapped ion quantum computer, or a photonic device.

17. The one or more non-transitory computer readable media of claim 14, wherein to provide the quantum computing algorithm to the plurality of quantum computers for execution, the program instructions cause the one or more processors to:
 provide a plurality of values respectively to the individual ones of the plurality of quantum computers; and
 request the individual ones of the plurality of quantum computers to execute the quantum computing algorithm repeatedly for a specific number of times indicated by respective ones of the plurality of values.

18. The one or more non-transitory computer readable media of claim 14, wherein the program instructions further cause the one or more processors to:
 obtain a plurality of calibration data respectively of the individual ones of the plurality of quantum computers; and
 determine a plurality of first-level weights respectively for the individual ones of the plurality of quantum computers based on at least one of (1) the plurality of calibration data, or (2) the number of times for which the individual ones of the plurality of quantum computers repeatedly execute the quantum computing program.

19. The one or more non-transitory computer readable media of claim 18, wherein to aggregate the plurality of results to generate the ensemble result, the program instructions cause the one or more processors to:
 determine a plurality of weighted results using the plurality of first-level weights and the plurality of results obtained from the plurality of quantum computers; and
 determine the ensemble result using the plurality of weighted results.

20. The one or more non-transitory computer readable media of claim 18,
 wherein the calibration data for the individual quantum computer further includes data indicating at least one of (1) a time when a gate of the individual quantum computer was last updated or (2) a readout error of the gate of the individual quantum computer,
 wherein the result obtained from an individual quantum computer includes multiple results corresponding to the repeated executions of the quantum computing algorithm at the individual quantum computer, wherein the program instructions further cause the one or more processors to:
  for the multiple results obtained from the individual quantum computer,
   determine multiple second-level weights respectively for respective ones of the multiple results based on at least one of (1) the time when the gate of the individual quantum computer was last updated or (2) the readout error of the gate of the individual quantum computer; and
   determine multiple second-level weighted results using the multiple second-level weights and the multiple results, and
 wherein to aggregate the plurality of results to generate the ensemble result, the program instructions cause the one or more processors to:
  determine a plurality of first-level weighted results using the plurality of first-level weights and the plurality of second-level weighted results; and
  determine the ensemble result using the plurality of first-level weighted results.

* * * * *